INVENTOR.
D. A. FLUEGEL
BY Young & Quigg
ATTORNEYS

INVENTOR.
D. A. FLUEGEL
BY Young & Quigg
ATTORNEYS

United States Patent Office 3,555,418
Patented Jan. 12, 1971

3,555,418
OSCILLATOR HAVING VOLTAGE SENSITIVE CAPACITORS THEREIN AND CALIBRATION CIRCUIT MEANS

Dale A. Fluegel, Bartlesville, Okla., assignor to Phillips Petroleum Company, a corporation of Delaware
Filed Sept. 29, 1967, Ser. No. 671,827
Int. Cl. G01r *19/26, 1/02*
U.S. Cl. 324—120 5 Claims

ABSTRACT OF THE DISCLOSURE

A voltage to frequency circuit is provided, which utilizes an oscillator having a voltage sensitive capacitor therein. Means are provided for checing the span of the circuit periodically and for transmitting the span check signals to a computer. The oscillator input circuit is designed to eliminate direct current paths to ground.

This invention relates to apparatus for converting an input voltage into an output signal of a frequency which is representative of the magnitude of the input voltage. In another aspect it relates to an improved oscillator having voltage sensitive capacitors therein.

In recent years increasing use has been made of digital equipment for recording, computing and control operations. Since many industrial measuring and control systems utilize analogue electrical equipment to sense process variables, apparatus is required for converting analogue output signals from the sensing equipment to digital signals for use in computers. In my U.S. Pat. 3,094,875 there is disclosed a voltage to frequency converter which employs an oscillator having voltage sensitive capacitors therein. An input voltage to be measured is applied across these capacitors in such a manner as to change the frequency of the oscillator as a function of changes in magnitude of the input voltage. This results from the fact that the capacitance of the voltage sensitive capacitors is a function of the applied input voltage.

In accordance with the present invention there is provided an improved circuit of this general type which utilizes voltage sensitive capacitors. The input of the oscillator is designed such that there is no direct current path to ground. This eliminates ground loop circuits and increases the stability and accuracy of the oscillator. In accordance with another aspect of this invention, there is provided a voltage to frequency converter circuit which utilizes an oscillator having a voltage sensitive capacitor therein. Circuit means are provided for checking the span of the measuring circuit periodically and for transmitting the resulting span check signals to a digital computer for storage and subsequent calculations. This permits analogue input signals to be measured accurately by comparing the output signal of the oscillator with the span check signal to eliminate errors which may occur if any drift takes place in the measuring circuit.

Accordingly, it is an object of this invention to provide improved apparatus for converting input voltage signals into output signals of frequency representative of the magnitude of the input signals.

Another object is to provide an improved oscillator which employs voltage sensitive capacitors to change the frequency of the oscillator as a function of input voltage signals.

Figure 1:
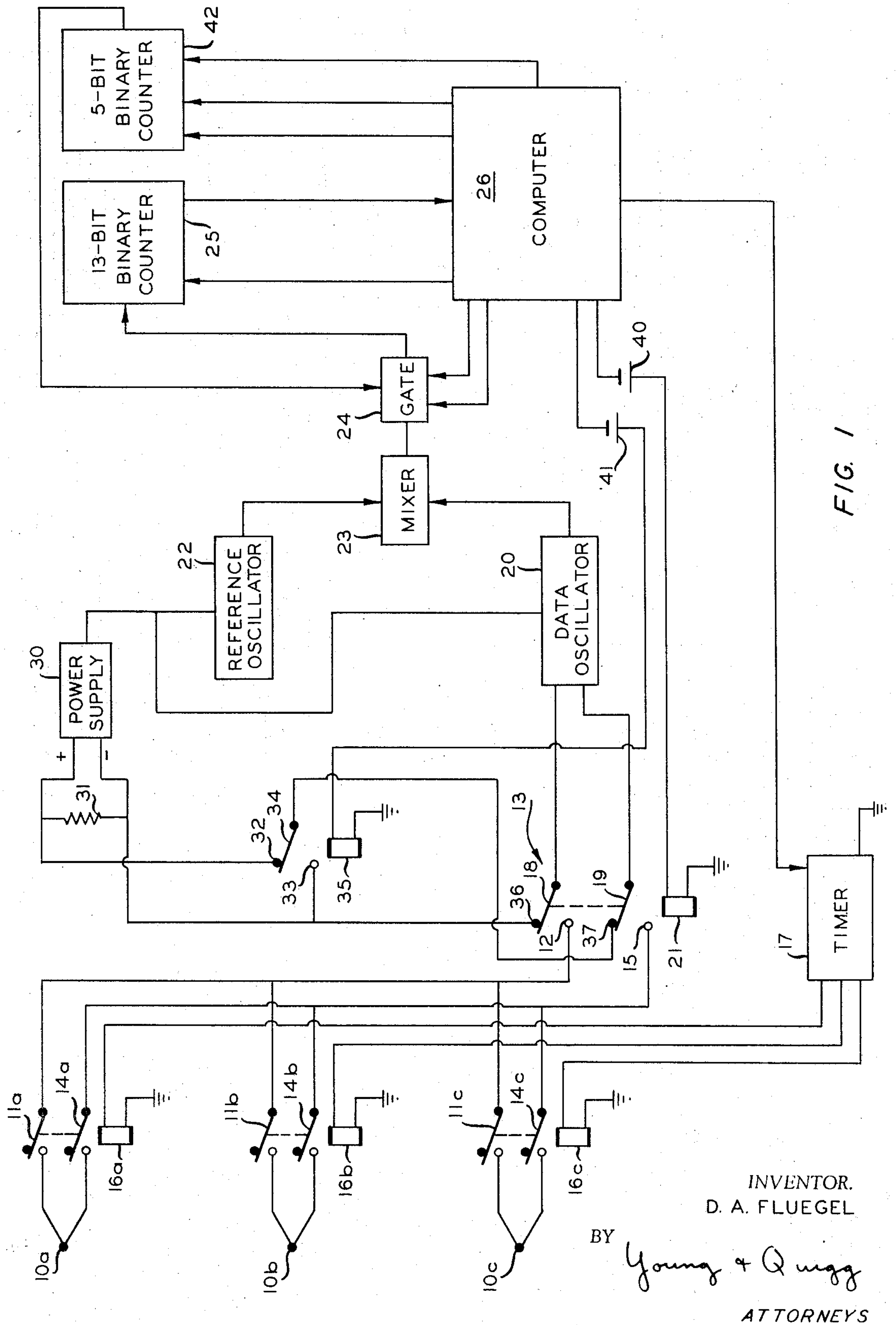
Figure 2:
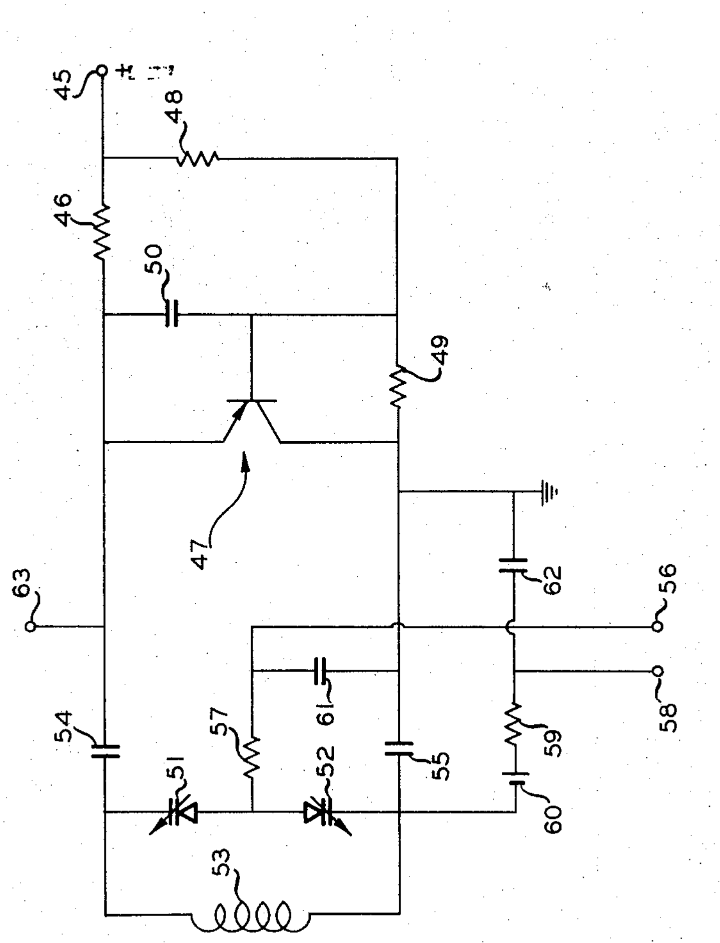
Figure 3:
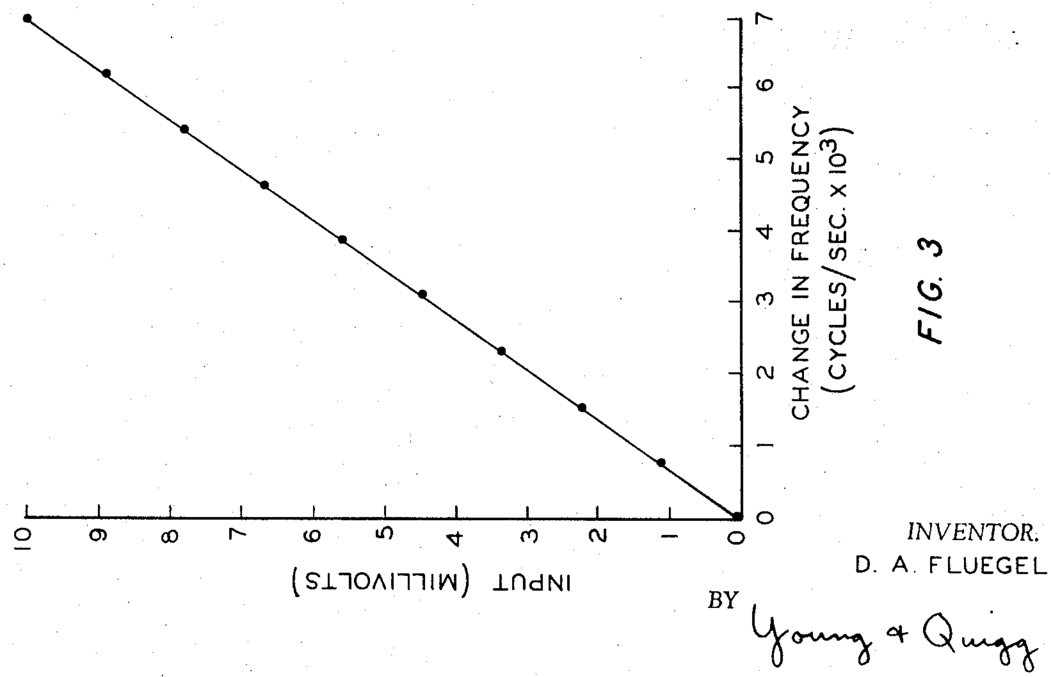

Other objects, advantages and features of the invention should become apparent from the following detailed description, taken in conjunction with the accompanying drawing in which:

FIG. 1 is a schematic circuit drawing of an embodiment of the signal measuring and conversion apparatus of this invention. FIG. 2 is a schematic circuit drawing of the data oscillator employed in the circuit of FIG. 1. FIG. 3 is a graphical representation of the operation of the oscillator of FIG. 2.

Referring now to the drawing in detail and to FIG. 1 in particular, there are shown three thermocouples 10*a*, 10*b* and 10*c* which are employed to measure temperatures in a process. These thermocouples are representative of any type of transducing element which provides a DC output voltage representative of a process condition to be measured. The first output terminal of thermocouple 10*a* is connected by a switch 11*a* to a terminal 12 of a calibration relay 13. The second output terminal of thermocouple 10*a* is connected by a switch 14*a* to a terminal 15 of relay 13. Switches 11*a* and 14*a* are closed when a relay coil 16*a* is energized. Thermocouples 10*b* and 10*c* are connected to relay 13 in similar fashion so that the switches associated with thermocouples 10*b* and 10*c* are controlled by respective relay coils 16*b* and 16*c*. Relay coils 16*a*, 16*b* and 16*c* are actuated selectively by a timer 17 in the manner described hereinafter. Switches 18 and 19 of calibrating relay 13 are connected to the respective input terminals of data oscillator 20. These switches engage respective terminals 12 and 15 when the coil 21 of relay 13 is energized.

The circuit of FIG. 1 is provided with a reference oscillator 22 which establishes an output signal of predetermined frequency. The output signals of oscillators 20 and 22 are applied to the respective inputs of a mixer 23 which establishes an output signal, the frequency of which is equal to the difference between the frequencies of oscillators 20 and 22. The output signal from mixer 23 is applied through a gate 24 to the input of a 13-bit binary counter 25. The output signal from counter 25 is applied to a digital computer 26 which is provided with a storage means.

Operating potentials are applied to oscillators 20 and 22 from a common power supply 30. Power supply 30 also applies an output potential across a resistor 31. The two end terminals of resistor 31 are connected to respective terminals 32 and 33 which are adapted to be engaged selectively by a switch 34, the latter engaging terminal 33 when a relay coil 35 is energized. The negative terminal of power supply 30 is connected to a terminal 36 which is adapted to be engaged by switch 18. Switch 34 is connected to a terminal 37 which is adapted to be engaged by switch 19. Relay coils 21 and 35 are connected in circuit with respective current sources 40 and 41 when switches, not shown, within computer 26 are closed.

Gate 24 is selectively opened by output signals from computer 26. This gate is of such configuration that counter 25 counts "up" when one of the gate control inputs is actuated and counts "down" when the other gate control input is actuated. The counting apparatus is also provided with a 5-bit binary counter 42 which is actuated by computer 26 and which functions to close gate 24. The operation of these counters and the gate circuit is described hereinafter in greater detail.

Data oscillator 20 is illustrated in FIG. 2. A positive operating potential is applied to terminal 45 from power supply 30 of FIG. 1. A resistor 46 is connected between terminal 45 and the emitter of a transistor 47. Resistors 48 and 49 are connected in series between terminal 45 and the collector of transistor 47, the latter being connected to ground. A capacitor 50 is connected between the emitter and the base of transistor 47, and the base of this transistor is connected directly to the junction between resistors 48 and 49. Two voltage sensitive capacitors 51 and 52 are connected in series relationship with an inductor 53. The junction between capacitor 51 and inductor 53 is connected by a capacitor 54 to the emitter of transistor 47. The junction between capacitor 52 and inductor 53 is connected by a capacitor 55 to the collector of transistor 47. The first input terminal 56 of oscillator 20 is connected by a resistor 57 to the junction between capacitors 51 and 52. The second input terminal 58 is connected by a resistor 59 and a voltage source 60 to the junction between capacitor 52 and inductor 53. Input terminals 56 and 58 are also connected to ground by respective capacitors 61 and 62. An output terminal 63 is connected to the emitter of transistor 47.

The frequency of the output signal which appears at terminal 63 is a function of the amplitude of the D.C. input signal applied between terminals 56 and 58. These terminals are connected to respective switches 18 and 19 of FIG. 1. The output frequency of the oscillator is determined by the capacitance of elements 51 and 52. These capacitors are voltage sensitive such that the capacitances thereof fluctuate as a function of the magnitude of the input voltages applied thereacross. In one specific embodiment of this invention, the circuit components were selected such that the oscillator had an output frequency of the order of 15 megacycles per second. The change in frequency of the oscillator as a function of an input D.C. signal is illustrated graphically in FIG. 3. It can readily be seen that the change in output frequency is a linear function of the input voltage.

Reference oscillator 22 of FIG. 1 can be a crystal oscillator having a constant output frequency of approximately 15 megacycles per second. The output signal from mixer 23 has a frequency which is equal to the difference between the frequencies of oscillators 20 and 22.

In the operation of the circuit of FIG. 1, calibration signals are first applied to computer 26. At this time, relay coil 21 is deenergized such that switches 18 and 19 engage respective terminals 36 and 37. Relay coil 35 initially is deenergized such that switch 34 engages terminal 32. Thus, a voltage representing the output of power supply 30 is applied to the input of data oscillator 20. Computer 26 provides output counting signals at predetermined intervals, such as at three milliseconds, to the input of counter 42. At the beginning of the calibration cycle, counters 25 and 42 are reset to zero by the computer and gate 24 is opened to permit counter 25 to count. The output signal from mixer 23 is transferred through gate 24 to counter 25 for a preselected time interval, which in this case is 96 milliseconds. At the end of this time, an output signal from counter 42 closes gate 24. Relay coil 35 is then energized to move switch 34 into engagement with terminal 33. This applies a zero input voltage to oscillator 20. Counter 42 is reset to zero and gate 24 is opened in such a manner as to permit counter 25 to count down. At this same time pulses are once again transmitted to counter 42 from computer 26. Gate 24 remains open for the same time interval as before, which results in counter 25 counting down to a value representing the "zero" voltage input to oscillator 20. At the end of this time interval, the output signal from counter 42 again closes gate 24. The residual count registered on counter 25 is then transferred to a storage drum in computer 26. This count is representative of the value of the output voltage of power supply 30, which voltage is carefully regulated so as to be a constant value.

The circuit of FIG. 1 is then employed to measure the output voltages of thermocouples **10*a*, 10*b* and 10*c*. These voltages are applied sequentially to the input of data oscillator 20 after relay coil 21 is energized to move switches 18 and 19 into contact with respective terminals 12 and 15. Computer 26 then energizes timer 17, and output signals from the timer sequentially energize relay coils 16*a*, 16*b* and 16*c*. When each of the thermocouple outputs is applied to oscillator 20, gate 24 is opened for a 96 millisecond time interval to permit counter 25 to register a value representative of the output voltage supplied by the thermocouple. The resulting signals are transferred to computer 26 where a simple ratio computation is made against the original calibration signal to provide an output which represents the thermocouple voltage, and thus the measured temperature. This sequence of events is repeated for each of the input signals to be measured. As previously discussed, any number of input voltages can be measured in this manner. While three thermocouples have been illustrated in order to simplify the description, in actual practice a substantially larger number of input signals normally is employed. The counter can be calibrated as often as may be desired merely by programming the computer to make the calibration. Computer 26** can supply the output temperature signals to a recorder or to automatic control equipment, as may be desired. While the use of a computer is desirable to perform the steps of this invention automatically in sequence, this is not essential to the invention. The various relays can be operated sequentially by a simple timer or even manually. The counter outputs can be measured or recorded for subsequent manual computation.

While this invention has been described in conjunction with a presently preferred embodiment, it should be apparent that it is not limited thereto.

What is claimed is:

1. Voltage to frequency conversion apparatus useable in voltage measuring comprising:

an oscillator having a voltage sensitive capacitor therein to provide an output signal of a frequency which is representative of the magnitude of a control potential applied to said oscillator;

a counter;

a source of reference potential;

a source of calibration potential of preselected magnitude which differs from said reference potential;

an input circuit adapted to receive a potential to be measured;

first means to apply said source of calibration potential to said oscillator as the control potential thereto and to apply the output of said oscillator to said counter to cause said counter to count in a forward direction;

second means to apply said source of reference potential to said oscillator as the control potential thereto and to apply the output of said oscillator to said counter to cause said counter to count in a reverse direction;

storage means to store the difference between the count registered by the counter in the forward direction and the count registered by the counter in the reverse direction, whereby the stored signal is available for use in providing a span correction operation on the apparatus;

third means to reset said counter;

fourth means to apply said input circuit to said oscillator as the control potential thereto and to apply the output of said oscillator to said counter to cause said counter to count in said forward direction; and timing means connected to said first, second, third and fourth means to (a) actuate said first means for a first time period, (b) thereafter actuate said second means for a time period equal to said first time period, (c) thereafter actuate said third means and (d) thereafter actuate said fourth means for a time period equal to said first time period.

2. The apparatus of claim 1, further comprising:

a reference oscillator of predetermined frequency;

a mixer circuit; and means connecting the outputs of the first-mentioned oscillator and said reference oscillator to said mixer circuit so that the output of said mixer circuit is representative of the difference in frequencies of the two oscillator, the output of said mixer circuit being connected in the same manner as the output of the first-mentioned oscillator as recited in claim 1.

3. The apparatus of claim 1 wherein said counter and said first, second, third and fourth means comprise:

a first counter;

a second counter;

a gate circuit;

means connecting the output of said oscillator to the input of said gate circuit;

means connecting the output of said gate circuit to said first counter;

means to apply signals at a predetermined rate to said second counter; and means responsive to said second counter receiving a predetermined number of signals to open said gate circuit means.

4. The apparatus of claim 1 wherein said oscillator comprises:

first and second voltage sensitive capacitors and an inductor connected in series relationship to form a tank circuit;

amplifying means connected to said tank circuit;

first and second input terminals;

first circuit means capable of passing direct current, connecting said first terminal to the junction between said capacitors; and second circuit means capable of passing direct current, connecting said second terminal to the junction between said inductor and one of said capacitors, said first and second circuit means being independent of any direct current path to ground.

5. The apparatus of claim 4, further comprising a first capacitor connected between said first terminal and ground, and a second capacitor connected between said second terminal and ground.

References Cited

UNITED STATES PATENTS 3,094,875 6/1963 Fluegel ----------- 324—120X

OTHER REFERENCES

Kinberg et al.; "Calibrated Analog to Digital Converter," IBM Technical Disclosure Bulletin, vol. 9, No. 11, April 1967, p. 1537.

RUDOLPH V. ROLINEC, Primary Examiner

E. F. KARLSEN, Assistant Examiner

U.S. Cl. X.R.

324—130